United States Patent [19]

Matsui et al.

[11] Patent Number: 4,626,093
[45] Date of Patent: Dec. 2, 1986

[54] FLASH CONTROL DEVICE FOR ELECTRONIC FLASH APPARATUS

[75] Inventors: Hideki Matsui, Yokohama; Nobuyoshi Hagyuda, Kawasaki, both of Japan

[73] Assignee: Nippon Kogaku K.K., Tokyo, Japan

[21] Appl. No.: 748,316

[22] Filed: Jun. 24, 1985

[30] Foreign Application Priority Data

Jun. 28, 1984 [JP] Japan .................. 59-133860

[51] Int. Cl.$^4$ ............................................. G03B 15/05
[52] U.S. Cl. .................................. 354/415; 354/416; 354/418; 354/132; 315/241 P
[58] Field of Search .................. 354/415–418, 354/132, 145.1, 149.1; 315/241 P, 307

[56] References Cited

U.S. PATENT DOCUMENTS

| | | | |
|---|---|---|---|
| 3,438,766 | 4/1969 | Biber | 354/415 |
| 3,846,811 | 11/1974 | Nakamura et al. | 354/145.1 |
| 3,997,815 | 12/1976 | Decker | 354/145.1 |
| 3,998,534 | 12/1976 | Schulze et al. | 354/417 X |
| 4,068,245 | 1/1978 | Ohtaki et al. | 354/149.1 |
| 4,199,242 | 4/1980 | Hosomizu et al. | 354/145.1 |
| 4,275,335 | 6/1981 | Ishida | 354/241 P |
| 4,349,260 | 9/1982 | Ishida et al. | 354/415 |
| 4,423,470 | 12/1983 | Naito et al. | 354/132 X |

*Primary Examiner*—William B. Perkey

*Attorney, Agent, or Firm*—Shapiro and Shapiro

[57] ABSTRACT

An electronic flash apparatus for flash photographing comprises flash discharge means, means for supplying a voltage to the flash discharge means, first light emission control means comprising first trigger means for triggering the flash discharge means to cause a discharge therein, for the purpose of the flash photographing and second light emission control means. The second light emission control means comprises oscillator means for generating periodic output signals, second trigger means for periodically triggering the flash discharge means in response to the periodic output signals thereby periodically initiating the discharge in the flash discharge means, detecting mean for generating an output signal upon detection of the initiation of the discharge in the flash discharge means and means for terminating the discharge in the flash discharge means in response to the output signal of the detecting means.

The electronic flash apparatus further comprises means for selecting either a first mode in which the flash discharge means is controlled by the first light emission control means or a second mode in which the flash discharge means is controlled by the second light emission control means, and means for driving the light emission control means in a manner different from the flash photographing.

14 Claims, 4 Drawing Figures

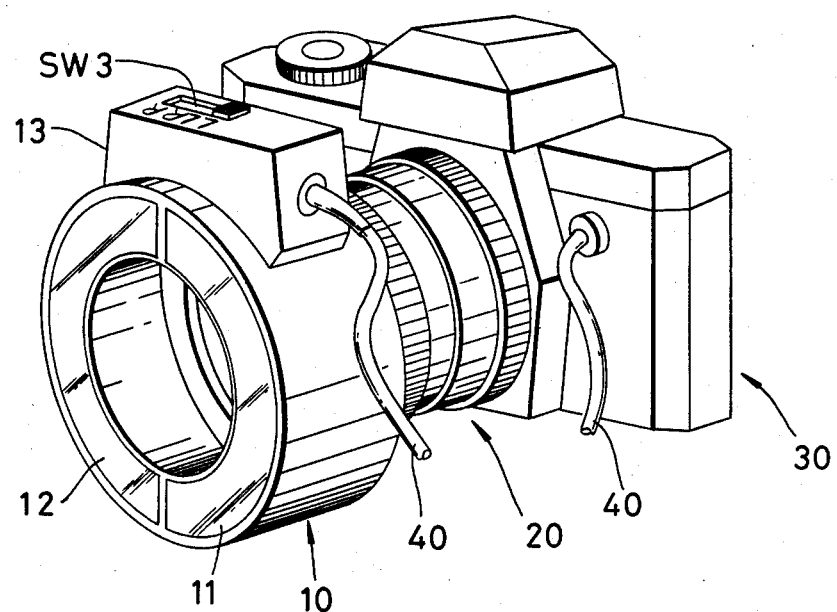
F I G.1

FLASH CONTROL DEVICE FOR ELECTRONIC FLASH APPARATUS

BACKGROUND OF THE INVENTION

1. Field of the Invention

The present invention relates to an electronic flash apparatus for photographing, and more particularly to flash control of a flash discharge tube in an electronic flash apparatus for close-up photographing.

2. Description of the Prior Art

Among electronic flash apparatus for illuminating an object to be photographed, there are already known an apparatus equipped with plural flash discharge tubes for obtaining efffective illumination, and an apparatus equipped with an annular flash tube positioned around the optical axis of a photographing lens for achieving uniform illumination in close-up photographing.

The U.S. Pat. No. 4,068,245 discloses an electronic flash apparatus provided with two flash tubes positioned at the front end of a photographing lens on both sides of the optical axis thereof, and two lamps likewise positioned on both sides of the optical axis. The two flash tubes generate light emission for illuminating an object in synchronization of the film exposure. The two lamps constitute so-called modelling illumination to be turned on prior to the photographing, in order to illuminate a dark object and thus facilitate the focusing operation through a finder of the camera.

Such conventional modelling illumination device has lacked compactness, as a space for such lamps, beside that for the flash tubes, has to be provided in the flash apparatus. Also the illumination with such lamps is unable to provide enough luminance to the object, and the obtained photograph may be different from the intention of the photographer because of unexpected shadows, as the position of illumination is different from that in the actual photographing operation.

SUMMARY OF THE INVENTION

An object of the present invention is to provide an electronic flash apparatus provided with a modelling illumination not associated with the aforementioned drawbacks in the conventional apparatus.

Another object of the present invention is to provide an electronic flash apparatus provided with a flash discharge tube which is commonly used for illuminating the object in synchronization with the film exposure and for modelling illumination.

Still another object of the present invention is to provide a modelling illumination device allowing a photographer to exactly know, in advance, the effect of illumination given to the object at the actual photographing.

In a preferred embodiment of the present invention, the flash discharge lamp performs high-speed flickering at the output frequency of an oscillator for the purpose of the modelling illumination, and said frequency is so selected as to cause an afterimage effect to the photographer.

Use of plural flash discharge tubes at different positions allows one to obtain various illuminating effect. In a preferred embodiment of the present invention, there are provided selector means for arbitrarily selecting a part or all of plural flash tubes and activating thus selected flash tube or tubes for photographing, and means for driving thus selected part or all of the flash tubes for the purpose of modelling illumination.

BRIEF DESCRIPTION OF THE DRAWINGS

FIG. 1 is a perspective view of a camera system in which mounted is an electronic flash unit embodying the present invention;

DESCRIPTION OF THE PREFERRED EMBODIMENTS

Figure 2:
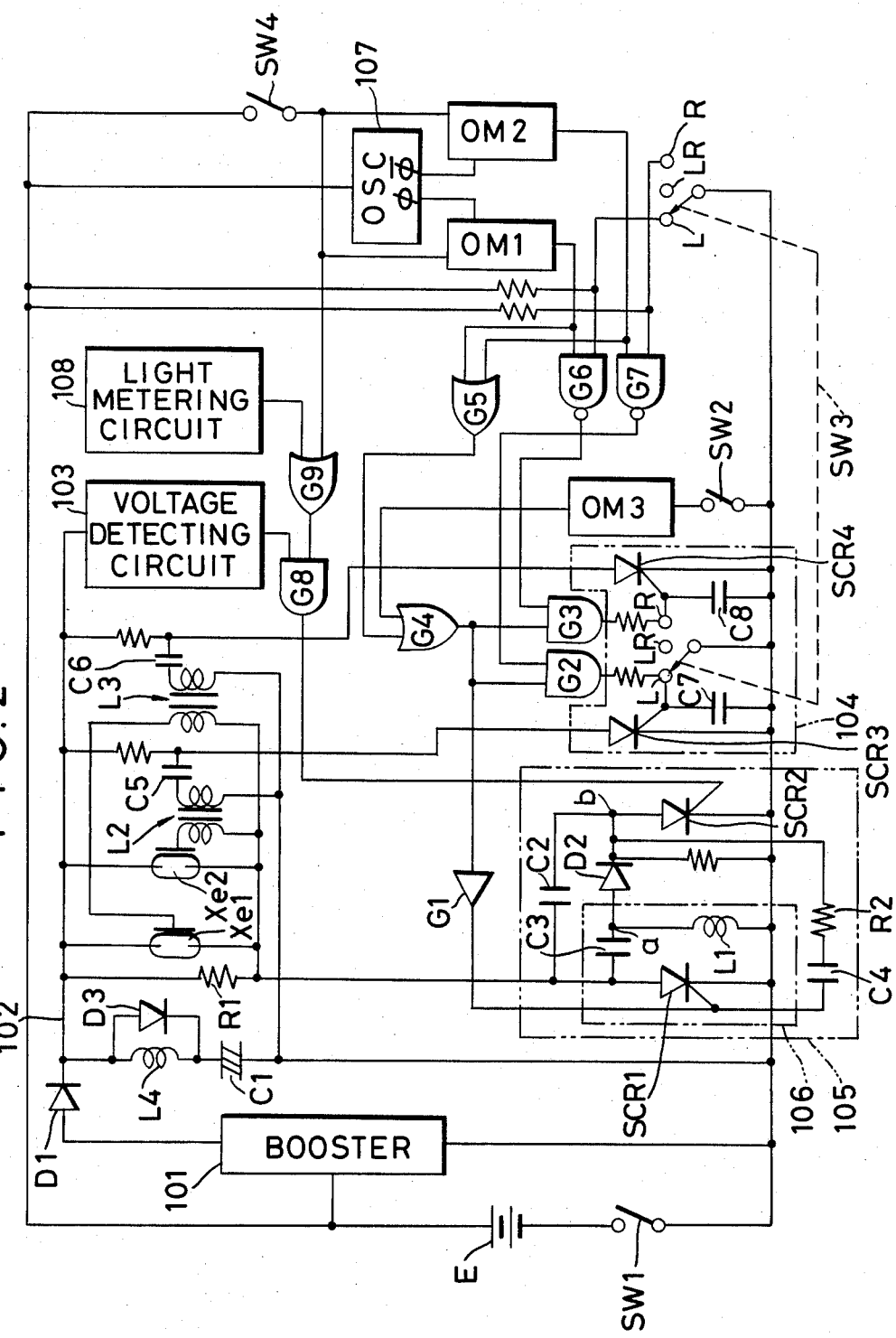
FIG. 2 is a circuit diagram of said electronic flash unit.

Referring to FIG. 1, a flash unit 10 is detachably fixed, by known means, to the front end of a photographing lens 20 mounted on a camera body 30. The flash unit 10 is electrically connected to the camera body 30 through a cable 40. The flash unit 10 has a cylindrical shape surrounding a central aperture constituting a photographing optical path, is provided at the front face with a pair of arc-shaped light-emitting windows 11, 12, and is equipped thereon with a control unit 13. Said control unit 13 receives information concerning luminance of the object, a synchronization signal generated at the start of exposure etc. from the camera body through the cable 40, and sends, to the camera body, a signal indicating the completed charging of a main capacitor, etc. The control unit 13 is provided with a mode selector switch SW3 and incorporates therein an electrical circuit shown in FIG. 2.

Now referring to FIG. 2, xenon flash tubes Xe1, Xe2 are respectively placed in the light emitting windows 11, 12 shown in FIG. 1. A power switch SW1 is serially connected to a power source E which supplies electrical power to a voltage booster 101. Said voltage booster 101 supplies electrical power to a main capacitor C1, through a diode D1 and a parallel circuit of a coil L4 and a diode D3. A voltage detecting circuit 103 generates a high (H) level signal for terminating the light emission, in response to a drop in the voltage of a high-voltage line 102 resulting from the light emission from the xenon flash tubes Xe1, Xe2. The xenon flash tubes Xe1, Xe2 are connected in parallel to a resistor R1 which is in turn connected to the high-voltage line 102, and cause light emission by a charge discharged from the main capacitor C1. Capacitors C5, C6 are respectively connected serially to the primary coils of transformers L2, L3 for triggering the discharges in said xenon flash tubes.

A triggering circuit is constituted by the transformers L2, L3 and a circuit 104, which comprises thyristors SCR3, SCR4 respectively driving the transformers L2, L3, and capacitors C7, C8 respectively connected to the gates of said thyristors.

A commutation circuit 105, for interrupting the discharges in the xenon flash tubes Xe1, Xe2, is provided with thyristors SCR1, SCR2, capacitors C2, C3, C4, a coil L1 and a diode D2, in which the thyristor SCR1, capacitor C3 and coil L1 constitute a voltage doubling circuit 106 for doubling the voltage applied across the electrodes of the xenon flash tubes Xe1, Xe2.

A one-shot multivibrator OM3, which is activated by a synchronization switch SW2 to be closed in synchronization with the start of exposure operation in the camera body, generates a pulse output signal to be supplied to AND gates G2, G3 through an OR gate G4. The output terminals of said AND gates G2, G3 are respectively connected to contacts L, R of the mode selector switch SW3 shown in FIG. 1. The common terminal of said switch SW3 is connected to a ground line, thus selectively grounding the contact L, LR or R. The contacts L, R are respectively connected to the gates of the thyristors SCR3, SCR4, whereby said contact L or R, when grounded, inhibits the function of the thyristor SCR3 or SCR4 by a pulse output signal from the AND gate G2 or G3.

Figure 3:
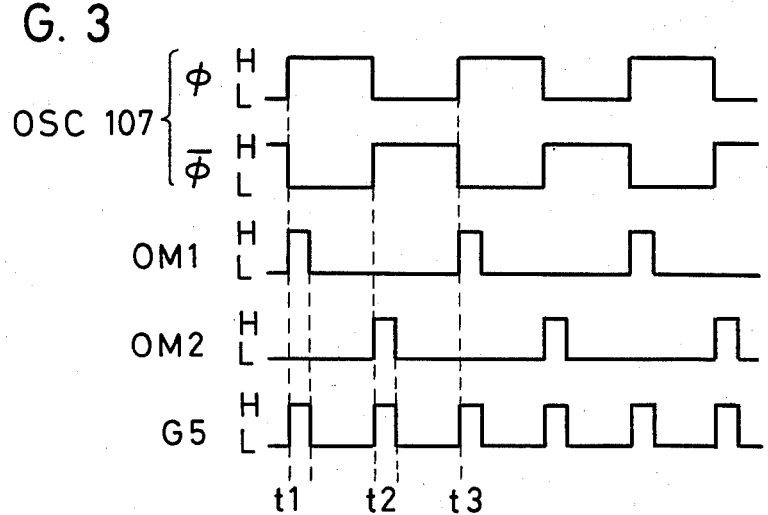
FIG. 3 is a timing chart showing the pulse control output signals in the circuit shown in FIG. 2.

An oscillator 107 generates output pulse signals $\Phi$, $\overline{\Phi}$ of mutually opposite phases as shown in FIG. 3. A one-shot multivibrator OM1 supplies an output signal as shown in FIG. 3 to an OR gate G5 and a NAND gate G6 in response to the output pulse signal $\Phi$ of said oscillator 107, while a one-shot multivibrator OM2 supplies an output signal also shown in FIG. 3 to the OR gate G5 and a NAND gate G7 in response to the output pulse signal $\overline{\Phi}$. The other input terminals of said NAND gates G6, G7 are connected, through respective resistors, to the power supply line and are respectively connected to the contacts L and R of the selector switch SW3. Thus, when the switch SW3 selects the contact L, the NAND gate G6 generates an H-level signal to open an AND gate G3, while the NAND gate G7 generates an H-level signal to open an AND gate G2 when the switch SW3 selects the contact R.

The output signal of the OR gate G5 is supplied, through an OR gate G4, to the AND gates G2, G3 and also supplied to the gate of the thyristor SCR1 through a buffer G1.

A light metering circuit 108 generates an H-level signal for interrupting the light emission when the light emission from the flash unit reaches a determined quantity. Said light metering circuit 108 is composed in the already known manner, comprising a sensor for receiving the light emitted by the flash unit and reflected by the object, and an integrating circuit. In case said light metering circuit 108 is incorporated in the camera body, said signal for interrupting the light emission is supplied to the flash unit through the cable 40. The light metering circuit 108 functions in response to the actuation of the synchronization switch SW2, and the signal, for interrupting the light emission is supplied to an AND gate G8 through an OR gate G9.

When a switch SW4 is closed, the OR gate G9 releases an H-level signal whereby the light emission terminating signal from the voltage detecting circuit 103 passes the AND gate G8 and is supplied to the gate of the thyristor SCR2. On the other hand, when the switch SW4 is open, the thyristor SCR2 is activated by the generation of two light emission terminating signals from the voltage detecting circuit 103 and the light metering circuit 108.

Now there will be explained the photographing procedure utilizing the above-described flash unit. At first the power switch SW1 is closed, and the camera is aimed at the object and focused thereto. If the object is not light enough for focusing operation, the switch SW4 is closed to activate the one-shot multivibrators OM1, OM2 for modelling illumination. Said multivibrators OM1, OM2 and the OR gate G5 respectively generate output signals as shown in FIG. 3, by the output pulse signals $\Phi$, $\overline{\Phi}$ of the oscillator 107.

Let us assume that the selector switch SW3 is positioned at the contact L to select a modelling illumination mode along with the light emitting window 11 at left.

Figure 4:
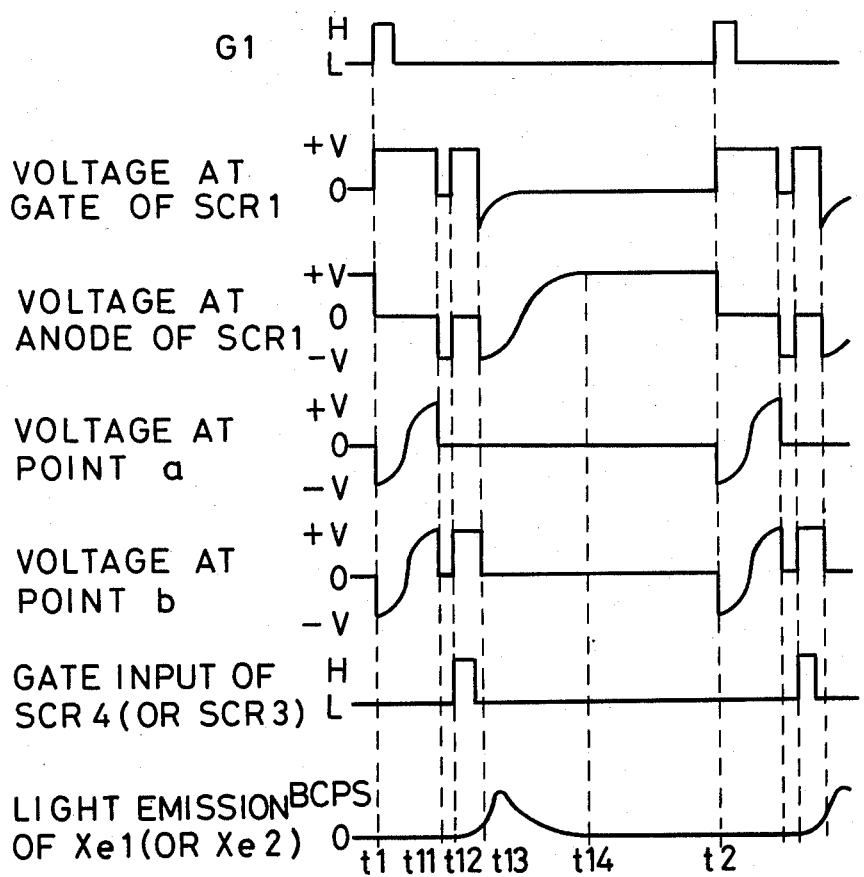
FIG. 4 is a wave form chart showing voltages at various junctions in the circuit shown in FIG. 2, represented in a more expanded time axis than in FIG. 3.

The thyristor SCR3 cannot be rendered conductive, even in the presence of a signal from the AND gate G2, since the gate thereof is grounded. The NAND gate G6, of which an input terminal is grounded, always releases an H-level output signal. Consequently, the output signal of the AND gate G3 is the same as that of the OR gate G4. Because of the absence of output from the multivibrator OM3, the OR gate G4 supplies the AND gate G3 with an output of the OR gate G5 having a doubled repetition rate, as shown in FIG. 3, compared with the output of the oscillator 107. Consequently the thyristors SCR4, SCR1 are periodically turned on and off respectively by the AND gate G3 and OR gate G4, whereby the xenon flash tube Xe1 is repeatedly triggered at a doubled repetition rate of that of the output of the oscillator 107. Now reference is made to FIG. 4 for explaining the repeated light emissions in more detailedly manner. It is to be noted that the timing chart in FIG. 4 is represented in a more expanded time scale than in FIG. 3.

In response to the closing of the power switch SW1, the capacitors C2, C3 of the commutation circuit 105 are charged, whereby the anode of the thyristor SCR1 assumes a positive potential while the anode of the thyristor SCR2 assumes a potential close to the ground potential. In this state the capacitor C4 is not charged.

In response to the closing of the modelling switch SW4, the pulses from the OR gate G4 are supplied to the thyristor SCR1 of the commutating circuit and the thyristors SCR3, SCR4 of the triggering circuit. As a delay circuit, composed of a resistor and a capacitor, is provided at the gate of the thyristor SCR3 or SCR4, the thyristor SCR4 is rendered conductive at a timing t12 delayed from the timing of the initial pulse. On the other hand, in response to a pulse supplied from the OR gate G4 through the buffer G1, the thyristor SCR1 is rendered conductive whereby the anode potential thereof varies as illustrated.

The activation of said thyristor SCR1 forms a closed loop of the thyristor SCR1, coil L1 and capacitor C3 and another closed loop of thyristor SCR1, coil L1, diode D2 and capacitor C2, both constituting LC serial resonance circuits. The discharge in each closed loop is commenced from the timing t1 with an LC serial resonant oscillation, whereby the voltages at points a, b show illustrated variations.

In an interval from t1 to t11, the voltage at the point a varies from $-V$ to $+V$ and then suddenly to zero, whereby the anode potential of the thyristor SCR1 becomes negative to apply a potential $-V$ to electrodes of the xenon flash tubes Xe1, Xe2. Since the other terminals of said xenon flash tubes receive a voltage $+V$ from the high-voltage line 102, the voltage across the xenon flash tubes Xe1, Xe2 temporarily becomes equal to the doubled voltage $+2V$, thus facilitating the discharge in said tubes.

The thyristor SCR1 is temporarily rendered non-conductive by the supply of a negative voltage to the anode. When the thyristor SCR4 is rendered conductive at a timing t12 due to a delay in the delay circuit, the xenon flash tube Xe1 initiates light emission whereby the discharge current is supplied to the capacitors C2, C3 and the thyristor SCR1 is rendered conductive again by the supply of a voltage to the gate thereof through the resistor R2 and capacitor C4. Thus the discharge current flows through the thyristor SCR1, which however is rendered non-conductive at an immediately following timing t13 by the light emission terminating signal from the detecting circuit 103.

More specifically, in response to the start of light emission by the activation of the thyristors SCR1, SCR4 at the timing t12, the detecting circuit 103 is activated and releases a light emission terminating signal at a timing t13. As the capacitor C2 is so charged as to provide a zero potential at the anode of the thyristor SCR1 and a positive potential at the point b in the interval from t12 to t13, the anode of the thyristor SCR1 is negatively biased when the thyristor SCR2 is rendered conductive in response to the light emission terminating signal. Simultaneously the gate of the thyristor SCR1 is negatively biased in the loop of the resistor R2 and capacitor C4, thus rendering the thyristor SCR1 non-conductive and terminating the light emission. Though the thyristor SCR1 is rendered non-conductive, the discharge current in the xenon flash tube Xe1 flows in the capacitors C2, C3 so that the light emission continues until a timing t14 when said capacitors C2, C3 are completely charged. As the charges of the capacitors C2, C3 required for the commutation for the next light emission to be commenced from a timing t2 are supplied by the discharge current of the xenon flash tube as explained above, the repeating frequency of the light emission at the modelling illumination can be elevated to several KHz or even higher.

The interval from the timing t1 when the SCR1 is rendered conductive to the timing t11 when the doubled voltage is supplied to the xenon flash tube is represented approximately by:

$$\pi \sqrt{L1(C2 + C3)} \text{ (seconds)}$$

wherein L1 is the capacitance of the coil L1, and C2 and C3 are capacitances respectively of the capacitors C2, C3.

As explained in the foregoing, when the modelling illumination switch SW4 is closed while the selector switch SW3 is placed at the positioned at L, the xenon flash tube Xe1 repeats light emissions at a frequency twice as large as that of the pulses $\Phi$ or $\bar{\Phi}$ of the oscillator 107.

When the selector switch SW3 is positioned at R, the AND gate G2 supplies the output pulse signals of the OR gate G4 to the gate of the SCR3, whereby the xenon flash tube Xe2 in the right light emitting window 12 repeats light emissions at a frequency twice as large as that of the pulses $\Phi$ or $\bar{\Phi}$ in the aforementioned manner.

If the switch SW4 is closed while the selector switch SW3 is positioned at LR, both xenon flash tubes Xe1, Xe2 alternately repeat light emissions. As the pulses $\Phi$, $\bar{\Phi}$ are mutually inverted in phase, the multivibrator OM1 supplies an H-level signal to the NAND gate G6 while the multivibrator OM2 supplies an L-level signal to the NAND gate G7. As the other input terminals of the NAND gates G6, G7 are maintained at the H-level, the output of the NAND gate G7 assumes the H-level at the timing t1 to open the AND gate G2, whereby the output pulse signal supplied from the OR gate G5 and transmitted by the OR gate G4 is given to the SCR3. Consequently the xenon flash tube Xe2 is triggered to emit light.

Then, at a timing t2, the pulses $\Phi$, $\bar{\Phi}$ are both inverted in phase to release an H-level signal from the NAND gate G6, whereby the AND gate G3 is opened to supply the output pulse from the OR gate G5 to the SCR4. Consequently the xenon flash tube Xe1 is triggered and emits light. The periodic light emissions of said flash tube is controlled by the commutation circuit as explained before, and light emission is obtained in response to each pulse from the OR gate G5. In this manner, the modelling illumination with both flash tubes provides uniform illumination without fluctuation in the light intensity, because of intermittent alternate activations of the flash tubes.

As explained in the foregoing, in case of modelling illumination with one of the flash tubes Xe1 and Xe2, either flash tube causes two light emissions within a cycle of the oscillator 107 from the timing t1 to t3, and, in case of such illumination with two flash tubes, each flash tube causes one light emission in said cycle. Thus, in the latter case, a higher frequency of repetition, obtained by a higher frequency of pulse signals from the oscillator, provides an effect as if both flash tubes are activated simultaneously.

After the photographing lens 20 is focused to the object sufficiently illuminated by the modelling illumination, a shutter release button of the camera body is actuated to initiate flash photographing. In this state the switch SW4 is turned off. The synchronization switch SW2 is closed in synchronization with the start of exposure to the photographic film, or, more exactly, when an exposing aperture is fully opened. The selector switch SW3 is maintained at a position same as in the foregoing modelling illumination.

The multivibrators OM1, OM2 are deactivated to maintain the input terminal of the OR gate G4 at the L-level, whereby the output of said OR gate G4 depends on the output of the multivibrator OM3. Consequently, in response to the closing of the synchronization switch SW2, the pulse signal from the multivibrator OM3 is supplied to the gate of the SCR1 through the OR gate G4 and buffer G1. Thereafter the function explained before takes place from the timing t1 to t12 as shown in FIG. 4 to cause light emission from the flash tube, but the light emission does not terminate so quickly as in the modelling illumination, since the OR gate G9 releases an L-level signal to close the AND gate G8 until the light emission terminating signal is released from the light metering circuit 108. When the light metering circuit 108 identifies that the quantity of illumination to the object has reached an adequate value, the outputs of the OR gate G9 and the AND gate G8 are shifted to the H-level, whereby the SCR2 of the commutation circuit is turned on to initiate the commutating operation, thus terminating the light emission of the flash tube.

In the foregoing embodiment various illuminating effects can be expected by using two or more flash tubes. It is also possible to serially connect these flash tubes and to cause them to emit light in turn.

We claim:

1. An electronic flash apparatus for flash photographing, comprising:
   flash discharge means comprising first and second flash tubes;
   means for supplying a voltage to said flash discharge means;
   selector means provided for selecting at least one of said first and second flash tubes and adapted to be manipulated by the operator, said selector means having a first selection mode selecting said first flash tube and a second selection mode selecting said second flash tube;

first light emission control means for triggering discharge in said first flash tube for said flash photographing when said first selection mode is selected and triggering discharge in said second flash tube for said flash photographing when said second selection mode is selected;

second light emission control means comprising oscillator means for generating periodic output signals and periodically triggering discharge in said first flash tube in response to said periodic output signals when said first selection mode is selected and in said second flash tube in response to said periodic output signals when said second selection mode is selected, wherein said second light emission control means is adapted to control said voltage supplying means in such a manner that flash tube light emission repeats at a period related to said periodic output signals; and means for driving said second light emission control means in a manner different from said flash photographing.

2. An electronic flash apparatus according to claim 1, wherein said selector means has further a third selection mode selecting both of said first and second flash tubes, said first light emission control means triggers discharge in both said flash tubes for said flash photographing when said third selection mode is selected and said second light emission control means triggers discharge in both said flash tubes in response to said periodic output signals when said third selection mode is selected.

3. An electronic flash apparatus for flash photographing, comprising;

flash discharge means comprising first and second flash tubes;

means for supplying a voltage to said flash discharge means;

selector means provided for selecting at least one of said first and second flash tubes and adapted to be manipulated by the operator, said selector means having a first selection mode selecting one of said first and second flash tubes and a second selection mode selecting both of said first and second flash tubes;

first light emission control means for triggering discharge in said one flash tube for said flash photographing when said first selection mode is selected and triggering discharge in both said flash tubes for said flash photographing when said second selection mode is selected;

second light emission control means comprising oscillator means for generating periodic output signals and periodically triggering discharge in said one flash tube in response to said periodic output signals when said first selection mode is selected and in both said flash tubes in response to said periodic output signals when said second selection mode is selected, wherein said second light emission control means is adapted to control said voltage supplying means in such a manner that flash tube light emission repeats at a period related to said periodic output signals; and means for driving said second light emission control means in a manner different from said flash photographing.

4. An electronic flash apparatus for flash photographing, comprising:

flash discharge means comprising first and second flash tubes;

means for supplying a voltage to said flash discharge means;

first light emission control means for triggering discharge in at least one of said flash tubes for said flash photographing;

oscillator means for generating first and second periodic output signals having the same period and mutually different phases;

second light emission control means for periodically triggering discharge in said first and second flash tubes in response to said first and second periodic output signals respectively, whereby said first flash tube repeats light emission alternately with light emission of said second flash tube; and means for driving said second light emission control means in a manner different from said flash photographing.

5. An electronic flash apparatus according to claim 4, wherein said first and second periodic output signals have mutually opposite phases.

6. An electronic flash apparatus according to claim 4, further comprising a housing; and first and second light emitting units having respective windows and accommodated in said housing; wherein said first and second flash tubes are respectively positioned in said first and second light-emitting units.

7. An electronic flash apparatus according to claim 4, wherein said first light emission control means comprises light metering means for measuring the qunatity of light emitted by said flash discharge means and producing an output signal when said quantity reaches a determined value; and means for terminating the discharge in said flash discharge in response to the output signal of said light metering means.

8. An electronic flash apparatus according to claim 4, further comprising selector means provided for selecting one of said first and second flash tubes and adapted to be manipulated by the operator, and wherein said first light emission control means and said second light emission control means trigger discharge in said one flash tube, respectively.

9. An electronic flash apparatus for flash photographing, comprising:

flash discharge means comprising first and second flash tubes;

means for supplying a voltage to said flash discharge means;

first light emission control means for triggering discharge in at least one of said flash tubes for said flash photographing;

oscillator means for generating a periodic output signal of predetermined period;

second light emission control means for periodically triggering discharge in said first and second flash tubes in response to said periodic output signal, said first and second flash tubes repeating light emission at said predetermined period, alternately;

third light emission control means for periodically triggering discharge in one of said first and second flash tubes in response to said periodic output signal, with said one flash tube repeating light emission at half said predetermined period; and means for driving said second and third light emission control means in a manner different from said flash photographing, said driving means having a mode selector that selects between said second and third light emission control means.

10. An electronic flash apparatus according to claim 9, wherein said second light emission control means triggers discharge in said first and second flash tubes at mutually different phases.

11. An electronic flash apparatus according to claim 9, wherein said oscillator means generates first and second periodic outputs having the same period and mutually opposite phases, and said second light emission control means triggers discharge in said first and second flash tubes in response to said first and second periodic outputs, respectively.

12. An electronic flash apparatus according to claim 9, further comprising a housing; and first and second light emitting units having respective windows and accommodated in said housing; wherein said first and second flash tubes are respectively positioned in said first and second light-emitting units.

13. An electronic flash apparatus according to claim 9, wherein said first light emission control means triggers discharge in said first and second flash tubes when said mode selector selects said second light emission control means and triggers discharge in one of said flash tubes when said mode selector selects said third light emission control means.

14. An electronic flash apparatus comprising:
flash discharge means;
means for supplying a voltage to said flash discharge means;
trigger means for triggering said flash discharge means to initiate a discharge therein;
commutation means serially connected to said flash discharge means for terminating the discharge in said flash discharge means, said commutation means including a switching element adapted to pass a current flowing in said flash discharge means during the discharge therein and circuit means for supplying said switching element with a current of a direction opposite to that of the current flowing in said switching element thereby rendering the same non-conductive;
first light emission control means comprising means fot activating said trigger means; and means for activating said commutation means when the quantity of light emitted by said flash discharge means reaches a determined value; and
second light emission control means comprising oscillator means for generating periodic output signals; means for activating said trigger means at each period of said periodic output signals in response to said oscillator means; detecting means for generating an output signal upon detection of the discharge in said flash discharge means; and means for activating said commutation means in response to the output signal of said detecting means.

* * * * *